(12) United States Patent
Ito et al.

(10) Patent No.: US 10,168,532 B2
(45) Date of Patent: Jan. 1, 2019

(54) DISPLAY APPARATUS FOR VEHICLE

(71) Applicant: MAZDA MOTOR CORPORATION, Hiroshima (JP)

(72) Inventors: Seiichi Ito, Higashihiroshima (JP); Shigeyuki Mori, Higashihiroshima (JP); Hidenobu Nakashima, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/593,812

(22) Filed: May 12, 2017

(65) Prior Publication Data

US 2017/0343799 A1 Nov. 30, 2017

(30) Foreign Application Priority Data

May 30, 2016 (JP) .................. 2016-107418

(51) Int. Cl.
*G02B 27/01* (2006.01)
*G06K 9/00* (2006.01)
*G02B 27/00* (2006.01)
*G06F 3/01* (2006.01)

(52) U.S. Cl.
CPC ......... *G02B 27/01* (2013.01); *G02B 27/0093* (2013.01); *G06F 3/013* (2013.01); *G06K 9/00597* (2013.01); *G06K 9/00845* (2013.01); *G02B 2027/0187* (2013.01)

(58) Field of Classification Search
CPC ............... G02B 27/01; G02B 27/0093; G02B 2027/0187; G06K 9/00845; G06K 9/00597; G06F 3/013
See application file for complete search history.

(56) References Cited

U.S. PATENT DOCUMENTS

| 5,406,171 A * | 4/1995 | Moody ............. B60Q 9/00 307/10.8 |
| 6,757,085 B1 * | 6/2004 | Halldorsson ......... B60R 1/00 345/9 |
| 2002/0167589 A1 * | 11/2002 | Schofield ........... B60N 2/002 348/148 |
| 2010/0253543 A1 * | 10/2010 | Szczerba ........... B60Q 9/005 340/932.2 |
| 2011/0170023 A1 * | 7/2011 | Ishida .............. B60K 35/00 348/837 |

(Continued)

FOREIGN PATENT DOCUMENTS

| JP | 2002-019491 A | 1/2002 |
| JP | 2008-141574 A | 6/2008 |

*Primary Examiner* — David Tung
(74) *Attorney, Agent, or Firm* — Studebaker & Brackett PC

(57) ABSTRACT

There are provided right and left side-rearward cameras, an inside camera to detect a driver's eyeball position, main HUDs comprising projectors to form virtual images by projecting image information picked up by the cameras to reflecting mirrors and drive portions to adjust positions of the virtual images, and a ECU to control the projectors and the drive portions. The controller is configured to perform the process of calculating a distance between the eyeball position and a normal virtual-image display position which is located at a front end and an end portion, in a vehicle width direction, of a bonnet, and controlling the main HUDs such that a normal main view v1 is displayed at the normal virtual-image display position.

8 Claims, 15 Drawing Sheets

(56) References Cited

U.S. PATENT DOCUMENTS

| | | | |
|---|---|---|---|
| 2014/0036374 A1* | 2/2014 | Lescure | G02B 27/0101 359/630 |
| 2015/0070502 A1* | 3/2015 | Murayama | B60R 1/00 348/148 |
| 2016/0004076 A1* | 1/2016 | Matsubara | G02B 27/0101 345/7 |
| 2016/0209647 A1* | 7/2016 | Fursich | G02B 27/0093 |
| 2017/0169612 A1* | 6/2017 | Cashen | G06T 19/006 |

\* cited by examiner

DISPLAY APPARATUS FOR VEHICLE

BACKGROUND OF THE INVENTION

The present invention relates to a display apparatus for a vehicle which comprises an image pickup device to pick up a rearward image from a side portion, in a vehicle width direction, of the vehicle, and in particular, relates to the display apparatus for the vehicle which can adjust a position of a formed virtual image by changing an optical path of image information picked up by the image pickup device.

Conventionally, a head-up display device (HUD) which comprises a projector as a light source and a reflector to reflect display information displayed by the projector toward a projection area of a windshield glass of the vehicle, wherein a virtual image of the display information projected onto the projection area by the reflector is superposed on a forward view of the vehicle, is known. It is also known in the above-described HUD device that the virtual image of the display information is formed in front of the windshield glass, not at the projection area of the windshield glass, by changing an optical path of the display information.

Japanese Patent Laid-Open Publication No. 2008-141574 discloses a visual assist apparatus which comprises plural image pickup devices to pick up images in a visual field which is different from a visual field reflecting in a side mirror, a virtual side-mirror image display controller to display virtual side-mirror images at respective positions which correspond to the plural image pickup devices, and a HUD, wherein the virtual side-mirror image and a virtual image of information of the image picked up by the image pickup device which corresponds to this virtual side-mirror image are concurrently displayed on a windshield glass. Japanese Patent Laid-Open Publication No. 2002-019491 discloses a display apparatus which an information acquisition device to acquire information to be recognized by a driver, a display device (HUD) to display the acquired information on a windshield glass, and a visual-line direction detecting device to detect a direction of a driver's visual line, wherein the acquired information is displayed on the windshield glass at or in the vicinity of a position which is located on an axis of the direction of the driver's visual line.

Herein, the safety standards of the Road Transport Vehicle Act were reviewed according to the revision of the international standards regarding the mirror of the automotive vehicle. Consequently, it became possible to use combination of an image pickup camera and a monitor, in place of the mirror for safety confirmation of automotive vehicle, such as a rearview mirror or a side mirror, so that a so-called mirrorless vehicle was allowed to travel on a public road. According this review of the safety standards, while it is required to meet some requirements, such as an angle of a visual field and quality of a monitor image (video) being to be equal to or better than those of the conventional mirror for rearward confirmation, it has been expected to improve the safety due to visual-field expansion, the gas millage (fuel economy) due to aerodynamics improvement, reduction of noises (wind noise), and so on.

In the mirrorless vehicle, a pair of right-and-left rearward cameras are located at positions which correspond to respective arrangement positions of the side mirrors, and images picked up by these cameras are displayed respectively on a special monitor installed at an instrument panel, for example. Herein, when the driver wants to confirm a side-and-rearward view, it is necessary to change the driver's visual line direction from its forward direction (vehicle traveling direction) toward a direction of the special monitor, so that some complex operations are added to the driver, thereby increasing burdens on the driver. Further, the driver's visual line direction needs to be changed from its forward direction (vehicle traveling direction), which is inappropriate for the safety.

By applying the technologies of the above-described patent documents to the mirrorless vehicle, the virtual images of the image information picked up by the right-and-left rearward cameras can be formed at the windshield glass by using the HUD so as to suppress a move of the driver's visual line direction, thereby reducing the burdens on the driver. However, since the mirrorless vehicle has no side mirror (fender mirror) at both sides of a front end of a vehicle body, it is difficult for the driver to intuitively recognize a width of its own vehicle relative to a distance of lanes in the vehicle traveling direction, so that there is a concern that the operability of the vehicle may be deteriorated. This may be true to the vehicle equipped with the side mirrors.

While the visual assist apparatus of the above-described first patent document concurrently displays the virtual side-mirror image and the virtual image of the image pickup device which corresponds to the virtual side-mirror image, it is unclear whether the virtual image of the image information picket up by the image pickup device is formed in front of the windshield glass. Moreover, it is necessary to set the optical path based on a position of an eyeball of the driver which is actually detected and the display position of the virtual image in order to set the virtual-image forming position precisely. However, since nothing about an eyeball position detector or an optical-path changing device is taught in the present patent document, it is difficult to set the virtual-image forming position of the image information picked up based on the eyeball position of the driver having a driving position, and also its changing is impossible, of course.

SUMMARY OF THE INVENTION

An object of the present invention is to provide a display apparatus for a vehicle which can make the driver properly recognize the side-and-rearward view information of the vehicle and the feeling of the own vehicle's width, without moving the driver's visual line direction substantially.

The display apparatus for the vehicle of the present invention comprises an image pickup device to pick up a rearward image from both side portions, in a vehicle width direction, of the vehicle, an eyeball-position detecting device to detect a position of an eyeball of a driver, an optical device comprising a projector and an optical-path changer, the projector being configured to form a virtual image in front of the driver by projecting image information picked up by the image pickup device to a reflector, the optical-path changer being configured to adjust a position of the virtual image formed by the projector by changing an optical path of the image information, and a controller to control the projector and an optical-path changer of the optical device, wherein the controller is configured to perform the process of calculating a distance between the eyeball position detected by the eye-ball-position detector and a specified virtual-image display position which is located in the vicinity of a front end and an end portion, in the vehicle width direction, of a vehicle body and controlling the optical device based on the calculated distance such that a position of the virtual image formed by the projector matches the specified virtual-image display position.

According to the present display apparatus for the vehicle, since the controller is configured to perform the process of calculating the distance between the eyeball position detected by the eye-ball-position detector and the specified virtual-image display position which is located in the vicinity of the front end and the end portion, in the vehicle width direction, of the vehicle body, an accurate positional relation between the driver's eyeball position and the specified virtual-image display position located in the vicinity of the front end and the end portion, in the vehicle width direction, of the vehicle body can be detected. Since the controller is configured to perform the process of controlling the optical device based on the calculated distance such that the virtual-image position formed by the projector matches the specified virtual-image display position, the driver can recognize the right and left side-and-rearward view information of the vehicle, keeping the driver's visual line directed to the forward direction (vehicle traveling direction), thereby intuitively recognizing the width of the own vehicle.

In an embodiment of the present invention, the display apparatus for the vehicle further comprises a confirmation device for confirming completion of driving preparation which is to be operated by the driver, wherein the controller is configured to start displaying of said virtual image of the picked-up image information when it is confirmed by the confirmation device that the driving preparation is complete.

According to this embodiment, the optical path of the image information picked up can be set based on the positional relation between the driver's eyeball position and the virtual-image display position.

In another embodiment of the present invention, the display apparatus for the vehicle further comprises an ignition state detector to detect an operational state of an ignition and a door-lock state detector to detect an operational state of a door lock, wherein the controller is configured to end displaying of said virtual image of the picked-up image information when it is detected by the ignition state detector and the door-lock state detector that the ignition is an off state and the door lock is locked from an vehicle outside.

According to this embodiment, the virtual image of the side-and-rearward view information of the vehicle can be displayed until the driver has got off the vehicle.

In another embodiment of the present invention, the above-described image pickup device is composed of a pair of right-and-left devices and the above-described optical device is composed of a pair of right-and-left devices, and the pair of right-and-left optical devices comprise a pair of laser-type projectors which are configured to have different optical paths and arranged in an instrument panel on a driver's seat side.

According to this embodiment, a pair of optical devices capable of independently controlling the optical path can be provided, without influencing other devices.

In another embodiment of the present invention, it is configured such that virtual images of a pair of image information are displayed at both-end positions of an angle width of a visual field of the driver which are located in the vicinity of the front end of the vehicle body when the angle width of the visual field of the driver which are located in the vicinity of the front end of the vehicle body is narrower than a width of the vehicle.

According to this embodiment, the side-and-rearward view information of the vehicle can be recognized regardless of a vehicle speed.

Other features, aspects, and advantages of the present invention will become apparent from the following description which refers to the accompanying drawings.

DETAILED DESCRIPTION OF THE INVENTION

Figure 1:
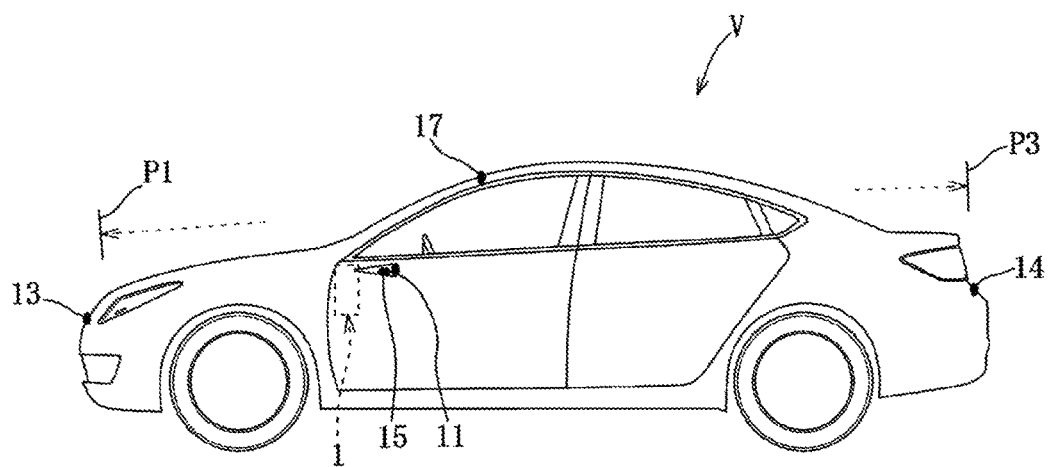
FIG. 1 is a side view of a vehicle provided with a display apparatus for a vehicle according to a first embodiment.
Figure 2:
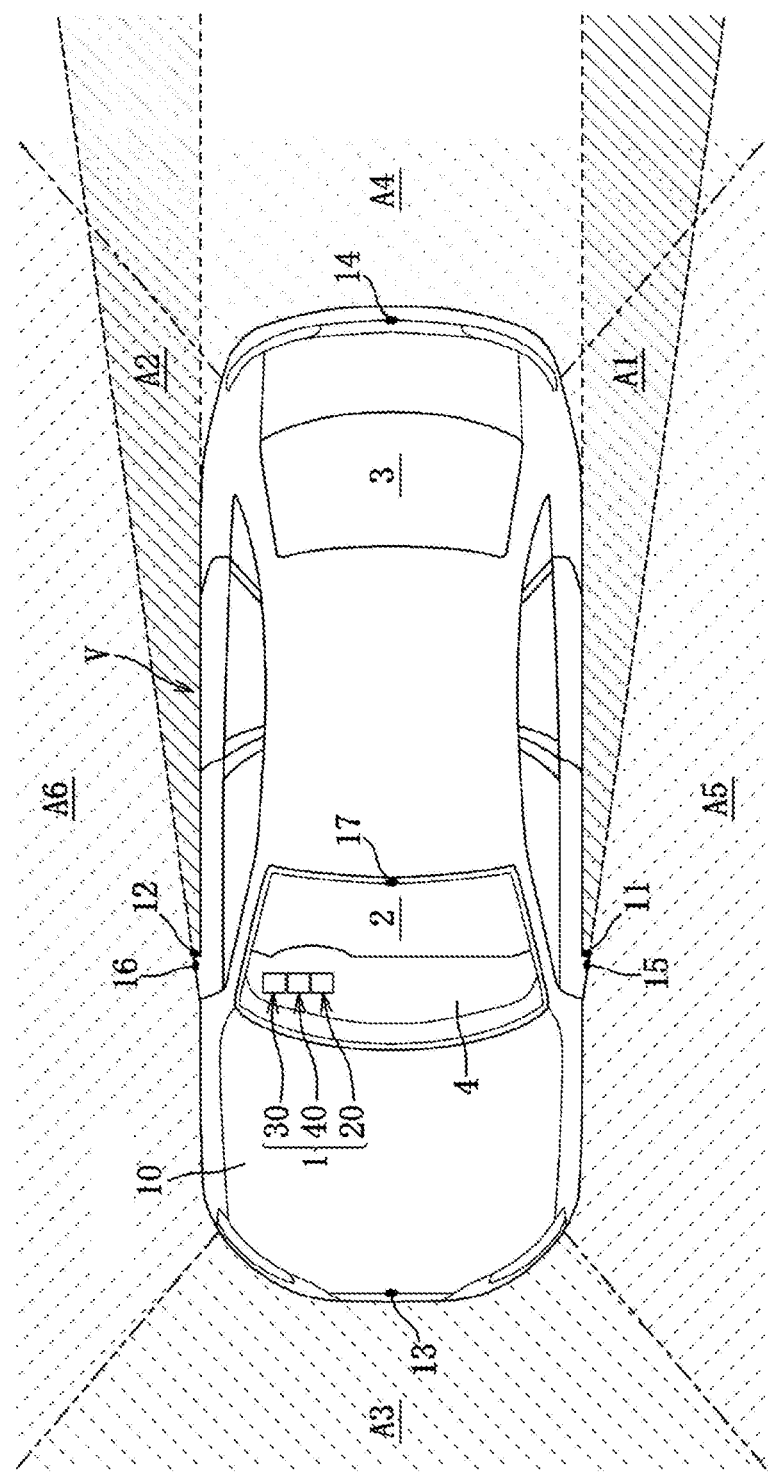
FIG. 2 is a plan view showing areas of images picked up by cameras.

Hereafter, embodiments of the present invention will be described referring to the drawings. In the following description, the present invention will be exemplified as a display apparatus of a side mirrorless automotive vehicle which is not provided with a pair of right-and-left side mirrors, and the present invention, the application of the present invention, or the use of the present invention should not be limited by the following description. Hereafter, vertical, lateral, and longitudinal directions for a driver seated in a driver's seat will be described simply as the vertical direction, the lateral direction, and the longitudinal direction, respectively.

A first embodiment of the present invention will be described referring to FIGS. 1-14. As shown in FIGS. 1-14, a vehicle V is provided with a display apparatus 1 which is capable of displaying right and left side-and-rearward pickup image information of the vehicle at a position located in front of a windshield (front window) glass 2 as a virtual view, in place of side mirrors. The vehicle V itself will be described first. The vehicle V comprises the windshield glass 2 through which the driver can recognize a forward view in a vehicle traveling direction, a rear window glass 3 through which the driver can recognize a rearward view, an instrument panel 4 which extends in a lateral direction (in a vehicle width direction) and where an air conditioner and other components are installed below the windshield glass 2, a steering wheel 5 which is arranged on a right-side part of the instrument panel 4, a center console 6 which extends rearward from a central portion below the instrument panel 4, a room mirror 7 which is provided so that its slant angle is adjustable around a lateral axes by means of a drive portion 7a, a shift lever 8 which is provided at the center console 6, a driving assist device 9 which assists driving of the vehicle V by the driver from a safety perspective, and others.

As shown in FIGS. 1-14, the vehicle V are provided with seven outside cameras 11-17 (image pickup devices) which pick up outside images of the vehicle V as a moving image and a pair of right-and-left inside cameras 18a, 18b which pick up inside images of a cabin, including a driver, as a still (static) image or a moving image. A left-and-rearward camera 11 and a right-and-rearward camera 12 are made of a well-known image sensor, such as a CCD (Charge Coupled Device), which are configured to pick up images in a left- and rearward pickup image area A1 and a right-and-rearward pickup image area A2 over a long distance from a beltline portion of a front door, respectively. Specifically, in a case where another traveling lane adjacent to a traveling lane of another vehicle following the vehicle V and the vehicle V or the traveling lane of the vehicle V are a single lane on each side, images of the above-described vehicle following the vehicle V and a road shoulder or a sidewalk are picked up. These side-and-rearward cameras 11, 12 are installed at respective side portions of front ends of right- and-left front doors.

Obstacle cameras 13-16 are made of a well-known image sensor capable of covering a wide-angle filed (130 degrees or more, for example) from the vicinity of the vehicle V to a middle distance from the vehicle V, such as a fisheye CCD, in order to pick up images in a dead-angle (corner) area for the driver seated in the driver's seat and obstacles having approached the vehicle V. The forward obstacle camera 13 is attached to a central portion of a front end of a front grill in a slant state where its front side slightly lowers so as to pick up images in a forward obstacle area A3, and the rearward obstacle camera 14 is attached to a central portion of a rear end of a trunk lid in a slant state where its front side slightly lowers so as to pick up images in a rearward obstacle area A4. The leftward obstacle camera 15, which is formed integrally with the left-and-rearward camera 11, is attached to a left-side wall portion of the left-and-rearward camera 11 in a slant state where its left side slightly lowers so as to pick up images in a leftward obstacle area A5. The rightward obstacle camera 16, which is formed integrally with the right-and-rearward camera 12, is attached to a right-side wall portion of the right-and-rearward camera 12 in a slant state where its right side slightly lowers so as to pick up images in a rightward obstacle area A6. The obstacle areas A3-A6 are set all around the vehicle V so that no dead (corner) area for the driver is created in a plan view.

The white-line camera 17 is the CCD which is attached to a central portion of a front end of a roof, which is configured to pick up images in a forward area including the traveling lane of the vehicle V over a long distance from the vicinity of the vehicle V. The image information picked up by the white-line camera 17 is outputted to the driving assist device 9. In the driving assist device 9, a pair of right-and-left white line portions of the traveling lane are estimated by executing the differential processing in a horizontal direction for the brightness of the forward pickup image information and also using edges of a high frequency generated at both end portions of a white line (partition line) on the traveling lane. A pair of white lines are extracted from the above-described estimated white line portions based on a threshold which is determined from a contrast between the brightness and a road surface, a threshold of a width of the white line, and the like. The driving assist device 9 is configured to calculate the extracted white-line information and a partition distance between the while line and the vehicle V (wheel), and issue an alert (warning or lamp lightning, for example) to make the driver pay attention when it is determined that the vehicle V possibly deviates from the while line of the traveling lane.

Figure 3:
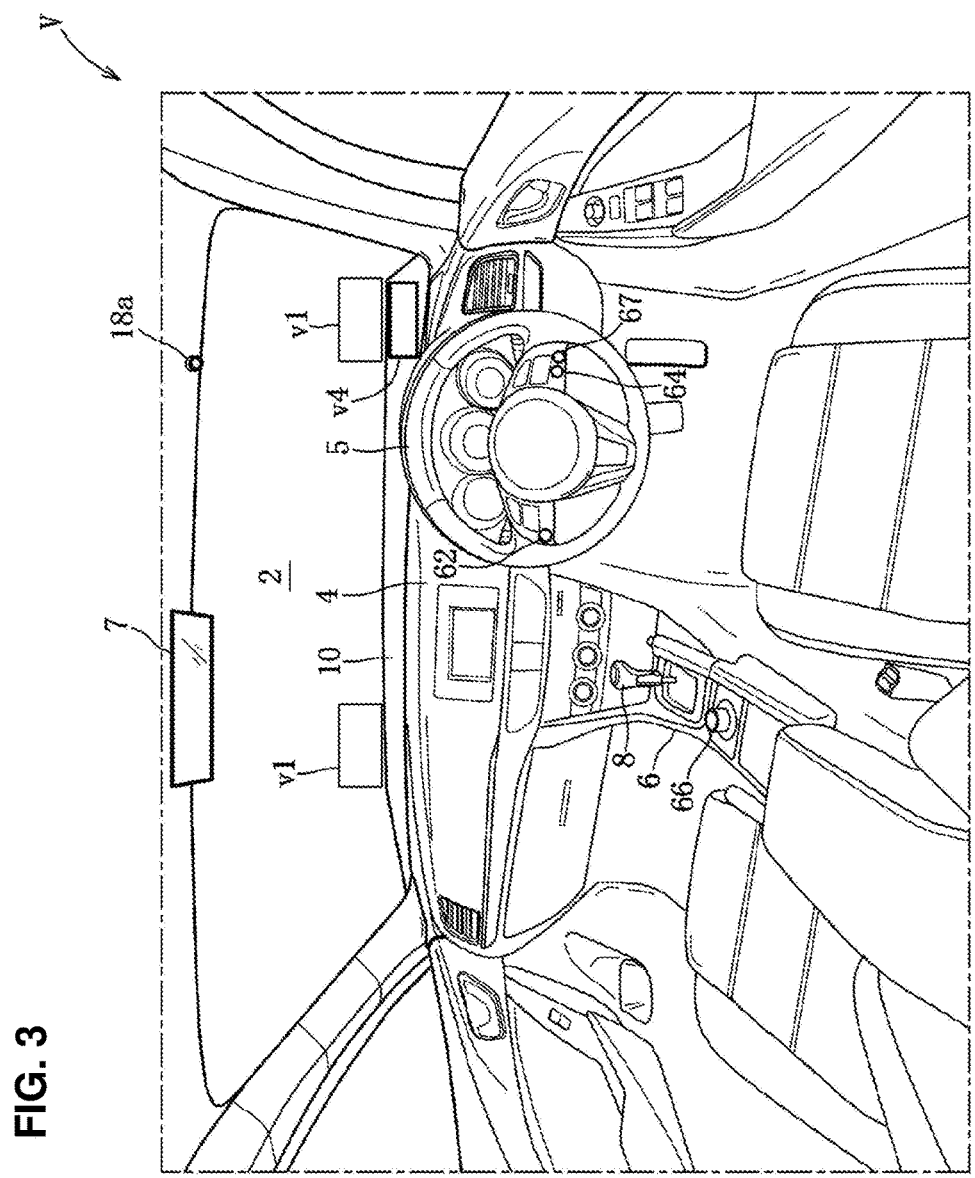
FIG. 3 is a view of a front portion inside a cabin.
Figure 4:
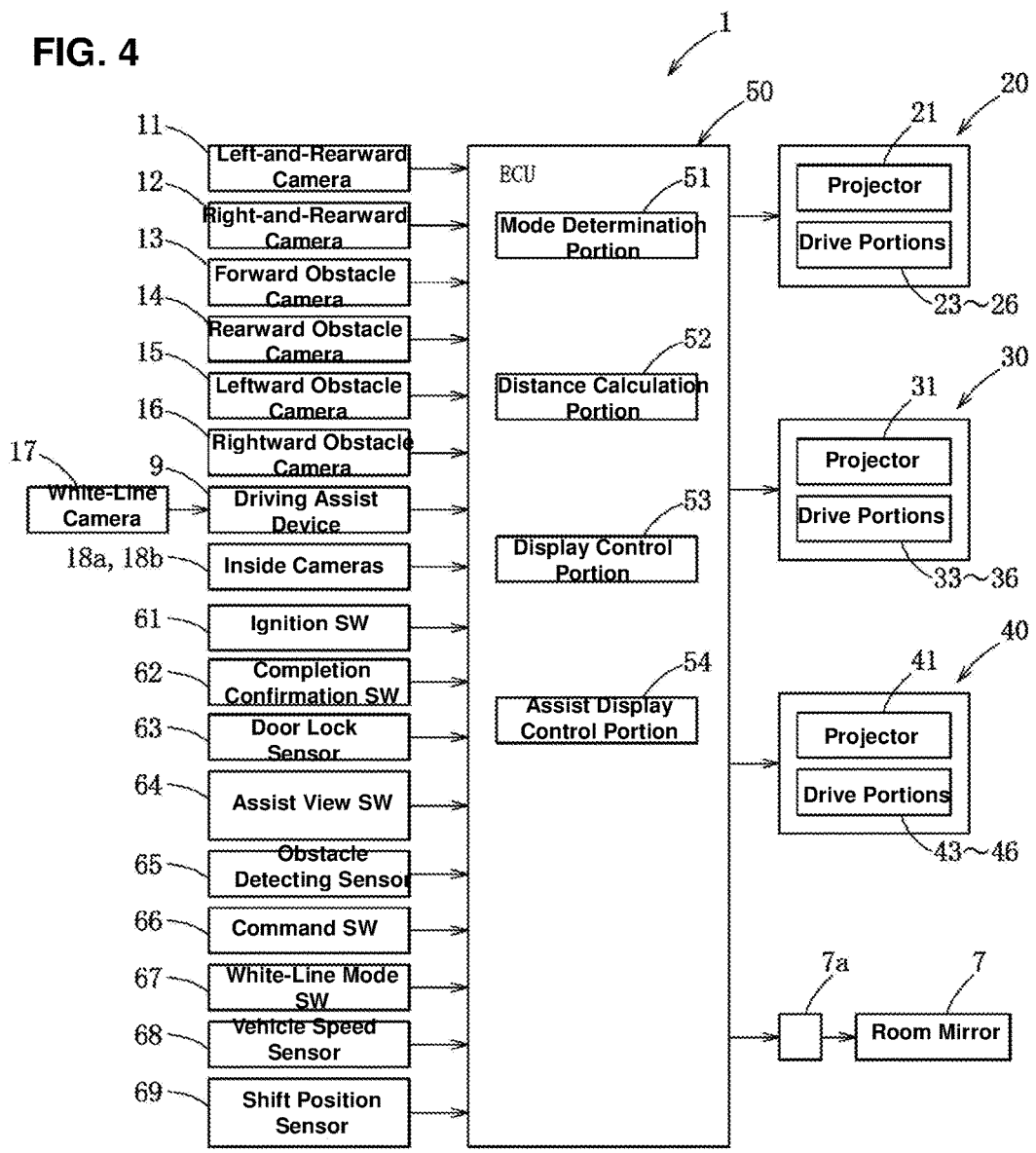
FIG. 4 is a control block diagram.

As shown in FIGS. 3 and 4, the inside camera 18a is made of the CCD which is attached to a right side portion of the front end of the roof such that it is positioned right before the driver seated in the driver's seat, and the inside camera 18b is made of the CCD which is attached to a right side portion of a rear end of the roof such that it is positioned right behind the driver seated in the driver's seat. The inside cameras 18a, 18b are configured to pick up an image of an upper half body of the driver including a face, respectively. The image of the face is extracted from the picked-up image of the driver's upper half body, the driver's eyeball is recognized through the general image recognition processing (pattern matching, for example), and then the three-dimensional coordinates of the position of the eyeball is calculated by transferring the driver's eyeball position from the camera-coordinate system to the vehicle-coordinate system (or the global coordinate system).

Next, the display apparatus 1 will be described. The display apparatus 1 of the present embodiment is configured to execute normal mode processing where virtual images of the right and left side-rearward normal pickup image information picked up by a pair of right and left side-and- rearward cameras 11, 12 are formed respectively at normal virtual-image display positions P1 which are set in the vicinity of right-and-left ends of a front end (vehicle-body front end) of a bonnet 10, white-line mode processing where the virtual images of the right and left side-rearward normal pickup image information picked up by the pair of right and left side-and-rearward cameras 11, 12 are formed respectively at forward virtual-image display positions P2 which are set so as to at least partially overlap the while lines of the traveling lane of the vehicle V, and back mode processing where a virtual image of a rearward obstacle pickup image information picked up by the rearward obstacle camera 14 is formed at a rearward virtual-image display position P3 which is set at a center, in the lateral direction, of a rear end of the vehicle body. Hereafter, a pair of right-and-left rectangular virtual images which correspond to the normal pickup image information of the pair of right and left side-and-rearward cameras 11, 12 in the normal mode will be referred to normal main views v1, a pair of right-and-left rectangular virtual images which correspond to the normal pickup image information of the pair of right and left side-and-rearward cameras 11, 12 in the white-line mode will be referred to forward main views v2, and a single rectangular virtual image which corresponds to the rearward obstacle pickup image information of the rearward obstacle camera 14 in the back mode will be referred to a rearward main view v3.

The display apparatus 1 is configured to form the virtual images of the obstacle pickup image information picked by the obstacle cameras 13-16 at a position located in the vicinity of one of the normal main views v1 which is closer to the obstacle in the normal mode or the white-line mode, and to form them at a position in the rearward main view v3 which is located closely to the obstacle in the back mode. Further, the display apparatus 1 is configured, in the normal mode or in the white-line mode, to form the virtual images of the obstacle pickup image information picked by the obstacle cameras 13-16 at a position which is located in the vicinity of the normal main view v1 and also in back of the front end of the bonnet 10 (at a lower position for the driver's view), and the display apparatus 1 is configured, in the back mode, to form the virtual images of the obstacle pickup image information picked up by the right and left side-rearward cameras 11, 12 and the obstacle cameras 13, 15, 16 at a position of the rear end of the vehicle body which is located in the vicinity of the rearward main view v3. Hereafter, the rectangular virtual image which corresponds to the obstacle pickup image information formed at the position located in the vicinity of one of the normal main views v1 will be referred to as a normal assist view v4, and the rectangular virtual image which corresponds to the obstacle pickup image information formed at the position located in the vicinity of the rearward main view v3 will be referred to as a rearward assist view v5. Further, the virtual views displayed at the normal assist view v4 and the rearward assist view v5 include a top view (bird's-eye view) created based on the pickup image information of the obstacle cameras 13-15.

As shown in FIGS. 1-4, the display apparatus 1 comprises a pair of right-and-left main head-up displays (hereafter, referred to as a main HUD) 20, 30 (optical device) which are configured to form the virtual image of the pickup image information picked up by the right and left side-and-rearward cameras 11, 12 as the main views v1, v2, one of which is configured to form the virtual image of the rearward obstacle pickup image information picked up by the obstacle camera 14 as the rearward view v3, and the other of which is configured to form the virtual images of the obstacle pickup image information picked up by the obstacle cameras 13, 15, 16 as the rearward assist view v5, a sub head-up display (hereafter, referred to as a sub HUD) 40 which is arranged between the pair of main HUDs 20, 30 and configured to form the virtual images of the obstacle pickup image information picked up by the obstacle cameras 13-16 as the assist view v4, ECU (Electric Control Unit) 50 (controller), and others. The main HUDs 20, 30 and the sub HUD 40 are arranged, in the lateral direction, in parallel from a central portion to a right side in the instrument panel 4, which are configured such that each optical path thereof is adjustable by means of an adjusting mechanism (not illustrated) manually operated by the driver.

Figure 5:
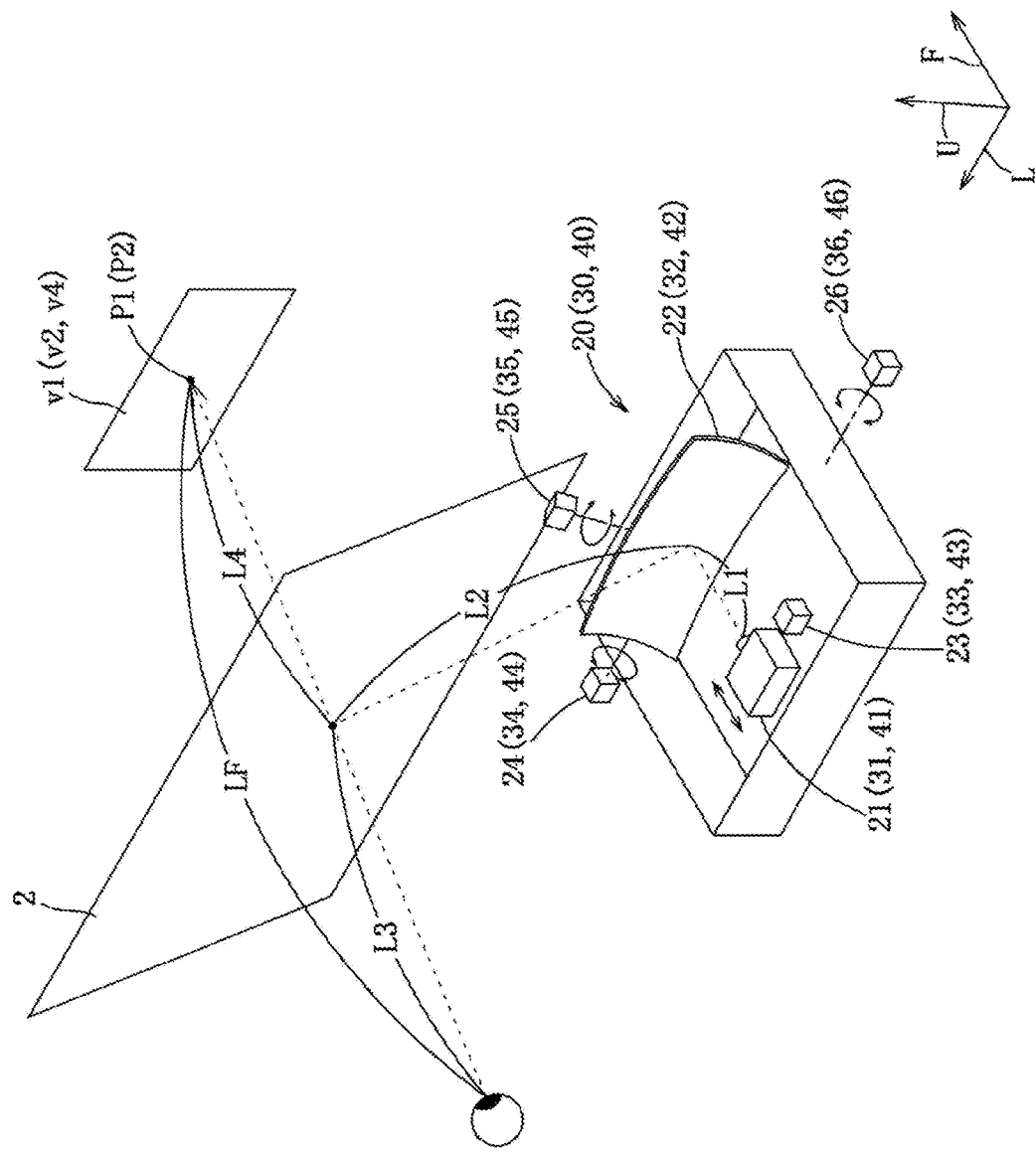
FIG. 5 is an explanatory diagram of optical paths in a normal mode.
Figure 6:
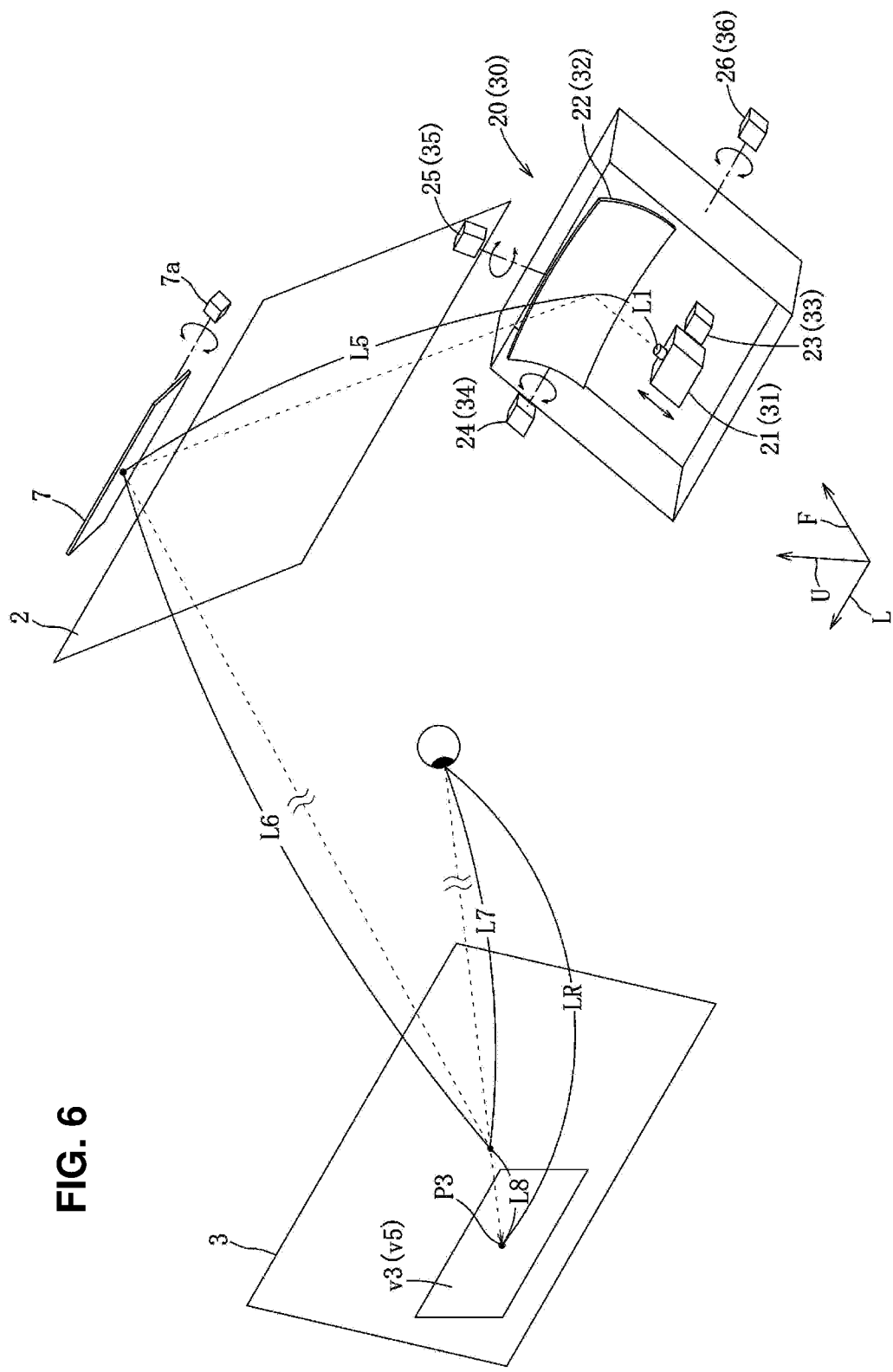
FIG. 6 is an explanatory diagram of optical paths in a back mode.

As shown in FIGS. 5 and 6, the left-side main HUD 20 comprises a lazar type projector 21 (light-projecting device) to project the pickup image information picked up by the left-and-rearward camera 11 and others, a reflecting mirror 22 (reflecting device) to reflect the pickup image information projected by the projector 21 toward the windshield glass 2 (or the room mirror 7), a drive portion 23 which is configured to move the projector 21 in the longitudinal direction, a drive portion 24 which is configured to rotate the reflecting mirror 22 around a vertical axes, a drive portion 25 which is configured to rotate the reflecting mirror 22 around a lateral axes, a drive portion 26 which is configured to rotate the main HUD 20 entirely around a lateral axes, and others. The drive portions 23-26 correspond to an optical-path changing device of the left-side main HUD 20.

Likewise, the right-side main HUD 30 comprises a lazar type projector 31 to project the pickup image information picked up by the right-and-rearward camera 12 and others, a reflecting mirror 32 to reflect the pickup image information projected by the projector 31 toward the windshield glass 2 (or the room mirror 7), a drive portion 33 which is configured to move the projector 31 in the longitudinal direction, a drive portion 34 which is configured to rotate the reflecting mirror 32 around a vertical axes, a drive portion 35 which is configured to rotate the reflecting mirror 32 around a lateral axes, a drive portion 36 which is configured to rotate the main HUD 30 entirely around a lateral axes, and others.

The sub HUD 40 comprises a lazar type projector 41 to project the pickup image information picked up by the obstacle cameras 11-16 and others, a reflecting mirror 42 to reflect the pickup image information projected by the projector 41 toward the windshield glass 2, a drive portion 43 which is configured to move the projector 41 in the longitudinal direction, a drive portion 44 which is configured to rotate the reflecting mirror 42 around a vertical axes, a drive portion 45 which is configured to rotate the reflecting mirror 42 around a lateral axes, a drive portion 46 which is configured to rotate the sub HUD 40 entirely around a lateral axes, and others. The drive portions 33-36 correspond to the right-side main HUD 30, and the drive portions 43-46 correspond to an optical-path changing device of the sub HUD 40, respectively.

Next, the ECU 50 will be described. The ECU comprises CPU (Central Processing Unit), ROM, RAM, inside interface, outside interface, and others. The ROM stores various programs and data for a display control, and the RAM includes processing memories to be used for a sequence of processing executed by the CPU.

As shown in FIG. 4, to the ECU 50 are electrically connected the pair of right and left side-and-rearward cameras 11, 12, the obstacle cameras 13-16, the white-line camera 17, the inside cameras 18a, 18b, an ignition switch 61, a completion confirmation switch 62, a door lock sensor 63, an assist view switch 64, an obstacle detecting sensor 65, a command switch 66, a white-line mode switch 67, a vehicle speed sensor 68, a shift position sensor 69, the pair of right-and-left main HUDs 20, 30, the sub HUD 40, and the drive portion 7a.

The white-line camera 17 detects the white line (partition line) on the traveling lane and outputs a detection signal through the driving assist device 9. The driving assist device 9 is configured to issue alerts, in addition to the above-described white-line deviation alert, an existence of a single or plural obstacles approaching the vehicle V and each obstacle's approaching direction to the driver based on detection results of the obstacle detecting sensor 65. The ignition switch 61 detects ON/OFF states of the ignition of the vehicle V and outputs a detection signal.

The completion confirmation switch 62 is arranged at the steering wheel 5 and configured to be turned on when the driver sits in the driver's seat and has a driving position and adjustments of indication position, a focus, and the like of the normal main view v1 are complete. The completion confirmation switch 62 is made of a momentary type switching SW which is configured to output a signal having a H (logic high) level to the ECU 50 only when this switch 62 is turned on by the driver, and output a signal having a L (logic low) level otherwise. The door lock sensor 63 detects a door lock state where the driver locks the door from the outside of the vehicle through an operation of a mobile terminal or the like and outputs a detection signal of that to the ECU 50.

The assist view switch 64 is arranged at the steering wheel 5, and configured to be turned on by the driver when the assist views v4, v5 are displayed. This assist view switch 64 is made of the momentary type switching SW which is configured to output the signal having the H level to the ECU 50 only when this switch 64 is turned on by the driver, and output the signal having the L level otherwise. The obstacle detecting sensor 65 is configured to detect any of plural obstacles approaching the vehicle V from any direction based on a distance between such obstacles and the vehicle V, and also to detect an approaching direction and an approaching speed of the obstacle and outputs their detection signals to the ECU 50.

The command switch 66 is configured to operate plural onboard devices installed to the vehicle V and select the obstacle (obstacle pickup image information) to be displayed on the assist views v4, v5. This command switch 66 outputs determination information of the camera which corresponds to the obstacle pickup image information selected by the driver among the cameras 13-16 having picked up the image of the obstacle. The white-line mode switch 67 is arranged at the steering wheel 5, and configured to be turned on when the driver switches the mode from the normal mode to the white-line mode. This white-line switch 67 is made of the momentary type switching SW which is configured to output the signal having the H level to the ECU 50 only when this switch 67 is turned on by the driver, and output the signal having the L level otherwise. The vehicle speed sensor 68 detects a traveling speed of the vehicle V and outputs its detection signal to the ECU 50, and the shift position sensor 69 detects a shift position based on an operational position of the shift lever 8 moved by the driver and outputs its detection signal to the ECU 50.

As shown in FIG. 4, the ECU 50 functionally comprises a mode determination portion 51 which is configured to determine a kind of mode (the normal mode, the white-line mode, the back mode) to be executed by the display apparatus 1, a distance calculation portion 52 (distance calculation configuration) which is configured to calculate a distance between the virtual-image forming position and the driver's eye point, a display control portion 53 which is configured to control the display position and others of the main views v1-v3, an assist display control portion 54 which is configured to control the display position and others of the assist views v4, v5, and others.

The mode determination portion 51 will be described. The mode determination portion 51 is configured to determine the white-line mode when the white-line mode switch 67 is turned on and to determine the back mode when it is detected by the inside cameras 18a, 18b that the driver's position is directed rearward and the shift position is a reverse range. The mode determination portion 51 is configured to determine the normal mode when the mode is not the white-line mode or the back mode. Herein, when the driver gets on the vehicle V and turns on the ignition switch 61, the display apparatus 1 is in a standby condition, so the mode is processed as the normal mode.

Next, the distance calculation portion 52 will be described. The distance calculation portion 52 calculates the distance between the driver's eye point and the displayed main views v1-v3 from the three-dimensional coordinates of the driver's eyeball positions detected by the inside cameras 18a, 18b and the three-dimensional coordinates of the display positions of the formed virtual images. In the normal mode, the normal main view v1 is displayed at the normal virtual-image display positions P1 set in the vicinity of the right-and-left left both ends of the front end of the bonnet 10 (see FIG. 7). In the white-line mode, the forward main views v2 are displayed at the forward virtual-image display positions P2 partially overlapping the white lines of the traveling lane (see FIG. 8). In the back mode, the rearward main view v3 is displayed at the rearward virtual-image display position P3 set at the center, in the lateral direction, of the rear end of the vehicle body (see FIG. 9).

As shown in FIG. 5, when the normal main view v1 is displayed at the normal virtual-image display position P1 in the normal mode, the distance LF between the driver's eye point (eyeball position) and the normal virtual-image display position P1 can be expressed by the following equation (1).

$$LF = L3 + L4 \quad (1)$$
$$= L3 + (L1 \times e1 + L2) \times e2$$

Herein, the distance between the projector 21 and the reflecting mirror 22 is expressed as L1, the distance between the reflecting mirror 22 and the windshield glass 2 is expressed as L2, the distance between the windshield glass 2 and the driver's eye point is expressed as L3, the distance between the windshield glass 2 and the normal virtual-image display position P1 is expressed as L4, the enlargement ratio of the reflecting mirror 22 is expressed as e1, and the enlargement ratio of the windshield glass 2 is expressed as e2. In a case where the three-dimensional coordinates of the eyeball in a state where the driver is seated in the driver's seat and holds the steering wheel 5, i.e., in a so-called driving-preparation complete state, are determined, a normal main-view optical path of the normal main view v1 can be set by adjusting at least one of the optical-path distance between the projector 21 and the reflecting mirror 22 and the optical-path distance between the reflecting mirror 22 and the windshield glass 2. Herein, while the left-side main HUD 20 has been described, the normal main-view optical path of the right-side main HUD 30 and the sub HUD 40 are similar.

In a case where the forward main views v2 are displayed at the forward virtual-view display positions P2 in the white-line mode, a forward main-view optical path of the forward main view v2 is set through the similar processing to the normal mode, except calculating the three-dimensional coordinates of the while line on the traveling lane based on the forward pickup view information picked up by the white-line camera 17 and setting the forward virtual-view display positions such that the forward main views v2 partially overlaps the right-and-left white lines recognized by the driver.

As shown in FIG. 6, when the rearward main view v3 is displayed at the rearward virtual-image display position P3 in the back mode, the distance LR between the driver's eye point and the rearward virtual-image display position P3 can be expressed by the following equation (2).

$$LR = L7 + L8 \quad (2)$$
$$= L7 + ((L1 \times e1 + L5) \times e3 + L6) \times e4$$

Herein, the distance between the projector 21 and the reflecting mirror 22 is expressed as L1, the distance between the reflecting mirror 22 and the room mirror 7 is expressed as L5, the distance between the room mirror 7 and the rear window glass 3 is expressed as L6, the distance between the rear window glass 3 and the driver's eye point is expressed as L7, the distance between the rear window glass 3 and the virtual-view forming position is expressed as L8, the enlargement ration of the reflecting mirror 22 is expressed as e1, the enlargement ration of the room mirror 7 is expressed as e3, and the enlargement ratio of the rear window glass 3 is expressed as e4. In a case where the position of the eye point in a state where the driver's driving preparation is complete is determined, a rearward main-view optical path of the rearward main view v3 can be set by adjusting at least one of the optical-path distance between the projector 21 and the reflecting mirror 22 and the optical-path distance between the reflecting mirror 22 and the room mirror 7. Herein, while the example in which the rearward main view v3 is displayed by the left-side main HUD 20 has been described, a case where the rearward main view v3 is displayed by the right-side main HUD 30 is similar. Further, in a case where the rearward assist view v5 is displayed by any one of the main HUDs 20, 30, the rearward assist view optical path is set similarly as well.

Next, the display control portion 53 will be described. The display control portion 53 controls the pair of main HUDs 20, 30 such that the pair of main views v1-v3 are displayed at the respectively-set virtual-view display positions P1-P3. This display control portion 53 is configured to start a virtual-view display control based on the mode determination when the driver turns on the completion confirmation switch 62 and to end the virtual-view display control when the ignition switch 61 is turned off and also the door lock sensor 63 detects the door-lock state. The display control portion 53 sets, based on the distance LF between the passenger's eye point and the normal virtual-image display positions P1, the normal main-view optical path for displaying the normal main view v1 at the normal virtual-view display positions P1 by means of the drive portions 23-26, 33-36, and others after the completion confirmation switch 26 is turned on. The normal main-view optical path is set such that respective outside corner portions, in the vehicle width direction, of lower sides of the pair of normal main views v1 substantially match both right-and-left end portions of the front end of the bonnet 10 which are visible for the driver. Thereby, as shown in FIGS. 3 and 7, the outside end portions, in the vehicle width direction, of the normal main view v1 are arranged so as to be roughly continuous vertically to the outside end portions, in the vehicle width direction, of the vehicle V.

Figure 7:
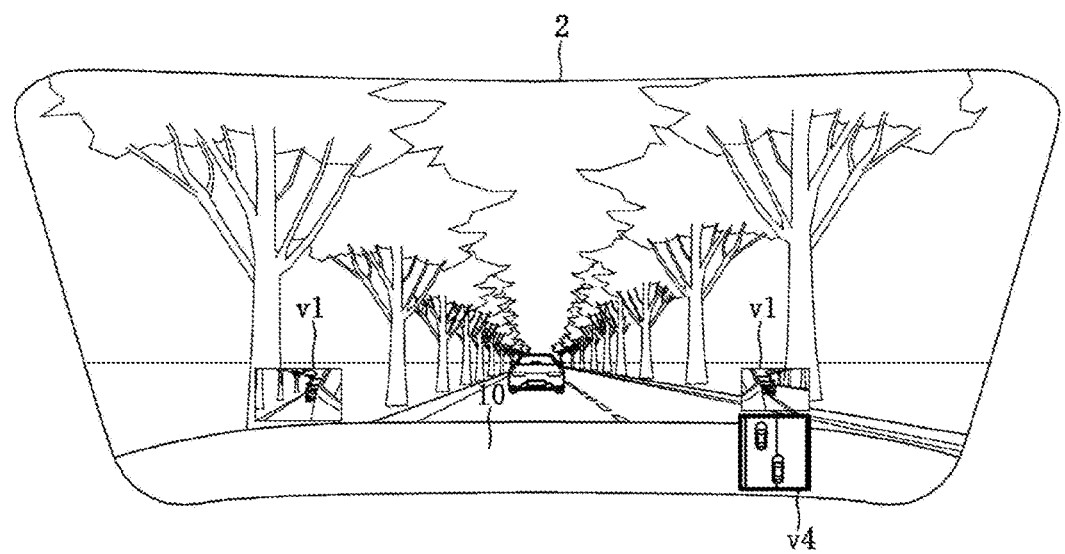
FIG. 7 is a diagram showing a visual field of a driver in the normal mode.

As shown in FIG. 7, the following vehicle and the sidewalk are displayed at the left-side normal main view v1, and the following vehicle and the adjacent traveling lane are displayed at the right-side normal main view v1. In the normal mode, the display control portion 53 corrects, based on a relation of the vehicle speed and a driver's visual-field angle, the normal main-view optical path such that the outside corner portions, in the vehicle width direction, of the lower sides of the pair of normal main views v1 substantially match the outside end portions, in the vehicle width direction, of an angle width of the visual field when the angle width of the driver's visual field becomes smaller than a lateral width of the front end of the bonnet 10. Herein, the visual-filed angle width is a lateral width of an area which is visible to the driver at the position of the front end of the bonnet 10 when the vehicle speed is a specified speed. Thereby, the driver can see (view) the right and left side-and-rearward pickup image information via the normal main views v1 regardless of the vehicle speed and recognize a sense of the vehicle width. Further, when the normal assist view v4 is displayed during execution of the normal mode, the size of the normal main view v1 which displays the normal assist view v4 is set to be smaller than that of the normal main view vi which does not display the normal assist view v4. Thereby, the driver is made relatively to pay attention to the displayed normal assist v4 more.

Figure 8:
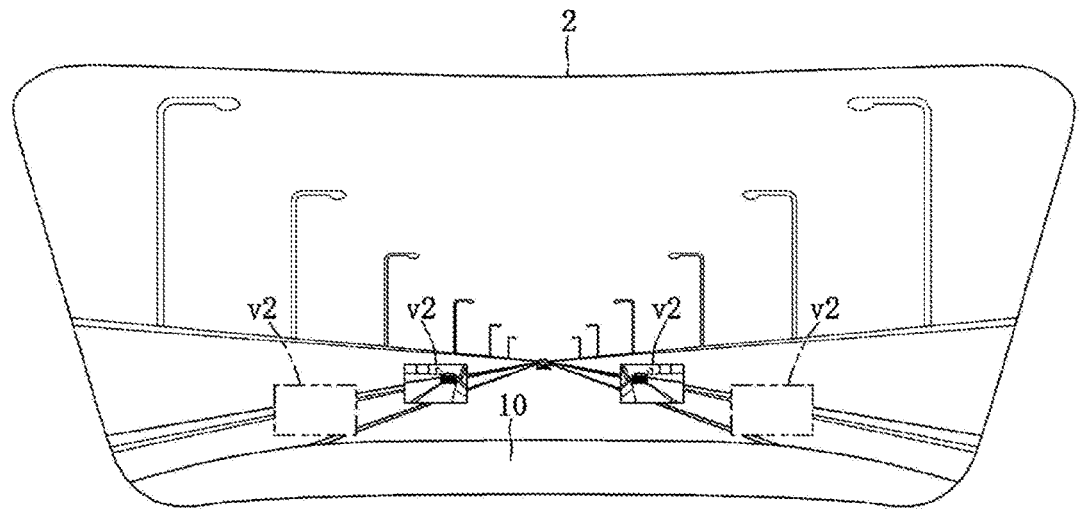
FIG. 8 is a diagram showing the visual field of the driver in a white-line mode.

As shown in FIG. 8, at the pair of forward main views v2 are displayed the following vehicle and the lane adjacent to the traveling lane of the vehicle V. In the white-line mode, the display control portion 53 displays the forward main views v2 at a position located in front of the front end portion of the bonnet 10 and makes the lower end portions of the white lines (virtual views) displayed in the forward main views v2 substantially match the corresponding white lines on the traveling lane recognized by the driver. The display control portion 53 obtains three-dimensional coordinates, in the vehicle-coordinate system, of the white line on the traveling lane based on the pickup image information of the white-line camera 17, and sets the forward main-view optical path such that the lower end portions of the white lines displayed in the forward main views v2 substantially match the corresponding white lines on the traveling lane. Thereby, the driver can recognize that the vehicle V is traveling on a right lane. Further, the display control portion 53 corrects the forward main-view optical path such that the forward main views v2 move forward more as the vehicle speed increases. A movable range of a longitudinal move of the forward main view v2 is set based on an influence of the vehicle speed and the visual field angle such that it is changeable in accordance with the vehicle speed within a range from the right-and-left end portions to a specified distance which corresponds to a specified size of the image which can be recognized by the driver whose vision in both eyes has 0.7 or more (the drive-license standards). The display control portion 53 sets the normal main-view optical path when the white-line camera 17 does not detect the white line on the traveling lane. When the normal main-view optical path is set, the processing similar to the normal mode is executed.

Figure 9:
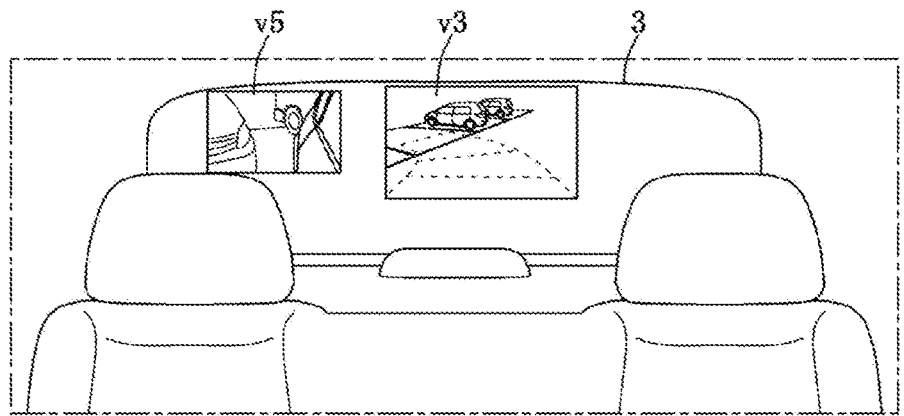
FIG. 9 is a diagram showing the visual field of the driver in the back mode.

As shown in FIG. 9, at the rearward main view v3 are displayed the pickup image of a vehicle's proceeding direction in a reverse range being selected and an estimated move locus of the vehicle V (broken lines). In the back mode, the display control portion 53 displays the virtual image (the rearward min view v3) of the obstacle information picked up by the rearward obstacle camera 14 at the rearward virtual-image display position P3 by using one of the main HUDs 20, 30 which display the normal pickup image information of the right and left side-rearward cameras 11, 12. The display control portion 53 starts execution of the back mode processing when it is detected by the inside camera 18b that the driver faces rearward and the reverse range is detected by the shift position sensor 69. The display control portion 53 makes the drive portions 7a, 23-26, 33-36 and others set the rearward main-view optical path for displaying the rearward main view v3 at the rearward virtual-image display position P3 based on the distance LR between the eye point of the driver facing rearward which is picked up by the inside camera 18b and the rearward virtual-image display position P3 after the reverse range's operation of the shift lever 8.

Next, the assist display control portion 54 will be described. The assist display control portion 54 controls the pair of main HUDs 20, 30 and the sub HUD 40 such that the obstacles, such as another vehicle approaching the vehicle V and a curb, are displayed at the assist views v4, v5. The assist view v4 is displayed by the sub HUD 40 during the normal mode or the white-line mode, and the assist view v5 is displayed by the main HUD 30 (20) which is closer to the obstacle during the back mode. Accordingly, the main HUD 20 (30) which is located further from the obstacle displays the rearward main view v3.

The assist display control portion 54 performs displaying of the obstacle at any one of the assist views v4, v5 so as to comply with the executed mode when the single obstacle approaching the vehicle V is detected by the obstacle detecting sensor 65. When the plural obstacles approaching the vehicle V are detected and the driving assist device 9 warns the plural detected obstacles, the assist display control portion 54 performs displaying of the obstacle which is selected by the command switch 66 at any one of the assist views v4, v5. Herein, when the single obstacle is warned, the displaying of the warned obstacle is performed. The assist display control portion 54 is set such that the color and the brightness of frames of the assist views v4, v5 are deeper and brighter than those of the frames of the main views v1-v3. Further, the assist display control portion 54 is set such that the closer to the vehicle V the obstacle selected for displaying is, the deeper and the brighter the color and the brightness of the frames of the assist views v4, v5 are.

As shown in FIG. 7, a top view where the following vehicle traveling on the lane adjacent to the traveling lane of the vehicle V approaches the vehicle V is displayed at the assist view v4. In the normal mode, the assist display control portion 54 sets the normal assist-view optical path such that the assist view v4 is displayed at a position which is located in the vicinity of the normal main view v1 which is closer to the obstacle, specifically in the vicinity of a lower side of the normal main view v1 which is closer to the obstacle, and also in back of the front end of the bonnet 10. In the white-line mode, the assist display control portion 54 sets the normal assist-view optical path such that the assist view v4 is displayed at a position which is located on the side of the forward main view v2 which is closer to the obstacle and also in back of the front end of the bonnet 10. As shown in FIG. 9, in the back mode, the assist display control portion 54 sets the normal assist-view optical path such that the left-and-rearward assist view v5 is displayed at a position which is located in the vicinity of the rearward main view v3 and also on the same side, in the lateral direction, as the obstacle being positioned relatively to the vehicle V.

Figure 10:
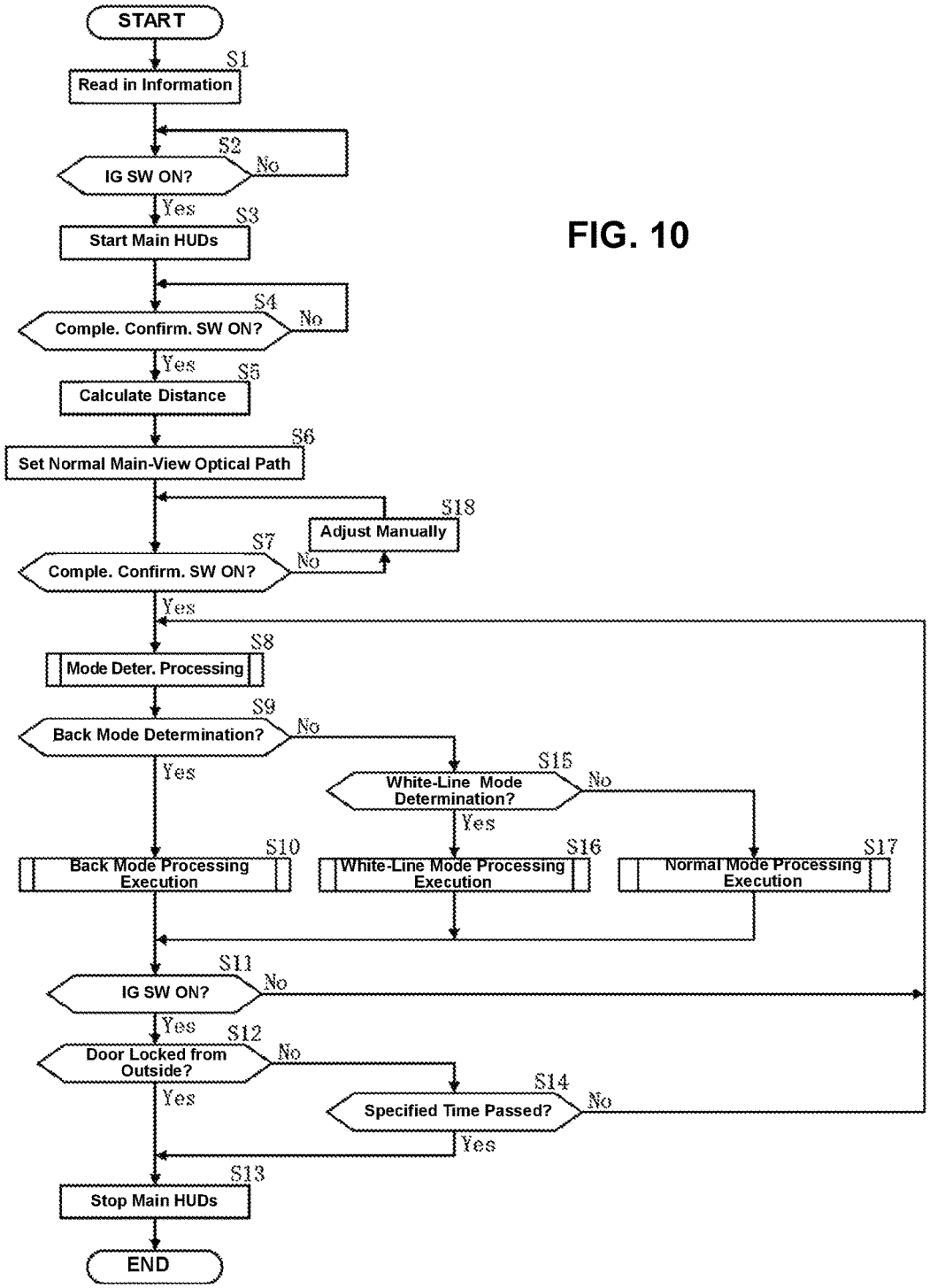
FIG. 10 is a flowchart showing display-control processing steps.

Next, steps of the display control processing will be described referring to flowcharts of FIGS. 10-14. Herein, Si (i=1, 2 . . . ) denote the steps of the processing. As shown in the flowchart of FIG. 10, detection values of the various sensors and information of the pickup image information picked up by the cameras and the like are read in step S1, and then the display control processing proceeds to step S2. In the step S2, it is determined whether the ignition switch 61 is turned on or not. In a case where it is determined in the step S2 that the ignition switch 61 is turned on, the processing proceeds to step S3, where the pair of right-and-left main HUDs 20, 30 are started. In a case where it is determined in the step S2 that the ignition switch 61 is not turned on, the processing waits until the ignition switch 61 is turned on.

In step S4, it is determined whether the completion confirmation switch 62 is turned on by the driver or not. This is for determining whether the driver has the driving position or not. In a case where it is determined in the step S4 that the completion confirmation switch 62 is turned on, since the driver is in the driving position, the distance LF to the normal virtual-image display position P1 is calculated based on the three-dimensional coordinates of the driver's eye point (in step S5), the normal main-view optical path is set (in step S6), and then the processing proceeds to step S7. In a case where it is determined in the step S4 that the completion confirmation switch 62 is not turned on, the processing waits until the completion confirmation switch 62 is turned on.

In step S7, it is determined whether the completion confirmation switch 62 is turned on by the driver or not. This is for determining whether the normal main views v1 are properly displayed or not. In a case where it is determined in the step S7 that the completion confirmation switch 62 is turned on, since the normal main views v1 are properly displayed, the processing proceeds to step S8, where a mode-determination processing is executed. In a case where it is determined in the step S7 that the completion confirmation switch 62 is not turned on, a manual adjustment is conducted with an adjuster (in step S18), and the processing returns to the step S7 for determination.

In step S9, it is determined whether the back mode determination is conducted or not. In a case where it is determined in the step S9 that the back mode determination is conducted, the back mode processing is executed (in step S10), and then the processing proceeds to step S11. In a case where it is determined in the step S9 that the back mode determination is not conducted, the processing proceeds to step S15, where it is determined whether the white-line mode determination is conducted or not. In a case where it is determined in the step S15 that the white-line mode determination is conducted, the white-line mode processing is executed (in step S16), and then the processing proceeds to the step S11. In a case where it is determined in the step S15 that the white-line mode determination is not conducted, the normal mode processing is executed (in step S17), and then the processing proceeds to the step S11.

In the step S11, it is determined whether the ignition switch 61 is turned off or not. In a case where it is determined in the step S11 that the ignition switch 61 is turned off, the processing proceeds to step S12, where it is determined based on the detection value of the door lock sensor 63 whether the door lock is conducted from the vehicle outside or not. In a case where it is determined in the step S12 that the door lock is conducted from the vehicle outside, the pair of right-and-left main HUDs 20, 30 are stopped (in step S13), and the processing is ended.

In a case where it is determined in the step S12 that the door lock is not conducted from the vehicle outside, the processing proceeds to step S14, where it is determined whether or not a specified time has passed after the turned-off operation of the ignition switch 61. In a case where it is determined in the step S14 that the specified time has passed after the turned-off operation of the ignition switch 61, the processing proceeds to the step S13. Meanwhile, in a case where the specified time has not passed yet, the processing proceeds to the step S8. In a case where it is determined in the step S11 that the ignition switch 61 is not turned off, the processing proceeds to the step S8.

Figure 11:
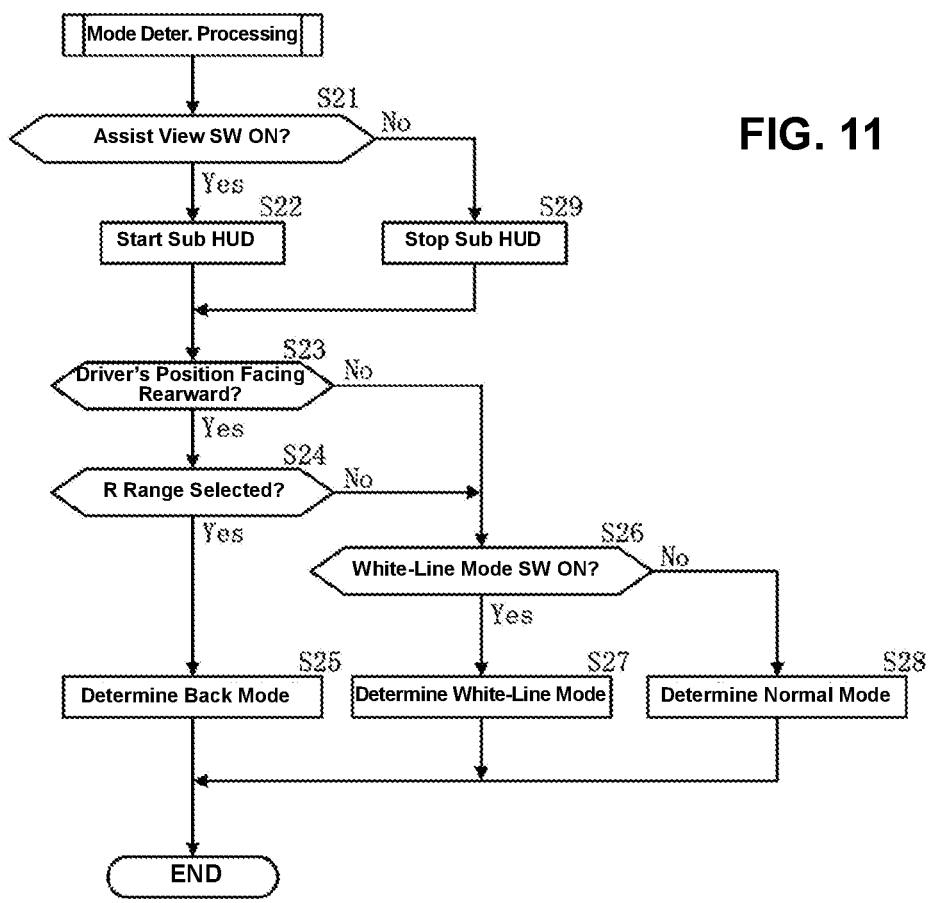
FIG. 11 is a flowchart showing mode-determination processing steps.

Next, the mode determination processing (in the step S8) will be described. As shown in the flowchart of FIG. 11, it is determined in step S21 whether the assist view switch 64 is turned on or not. In a case where it is determined in the step S21 that the assist view switch 64 is turned on, the sub HUD 40 is started (in step S22), and then the processing proceeds to step S23. In a case where it is determined in the step S21 that the assist view switch 64 is not turned on, the sub HUD 40 is stopped (in step S29), and then the processing proceeds to the step S23.

It is determined in the step S23 whether the driver has the position being directed rearward or not. In a case where it is determined in the step S23 that the driver has the position being directed rearward, the processing proceeds to step S24, where it is determined whether the shift position is the reverse range or not. In a case where it is determined in the step S24 that the reverse range is selected, the back mode is determined (in step S25), and then the processing is ended.

In a case where it is determined in the step S23 that the driver does not have the position being directed rearward or it is determined in the step S24 that the reverse range is not selected, the processing proceeds to step S26, where it is determined whether the white-line mode switch 67 is turned on or not. In a case where it is determined in the step S26 that the white-line mode switch 67 is turned on, the white-line mode is determined (in step S27), and then the processing is ended. In a case where it is determined in the step S26 that the white-line mode switch 67 is not turned on, the normal mode is determined (in step S28), and then the processing is ended.

Figure 12:
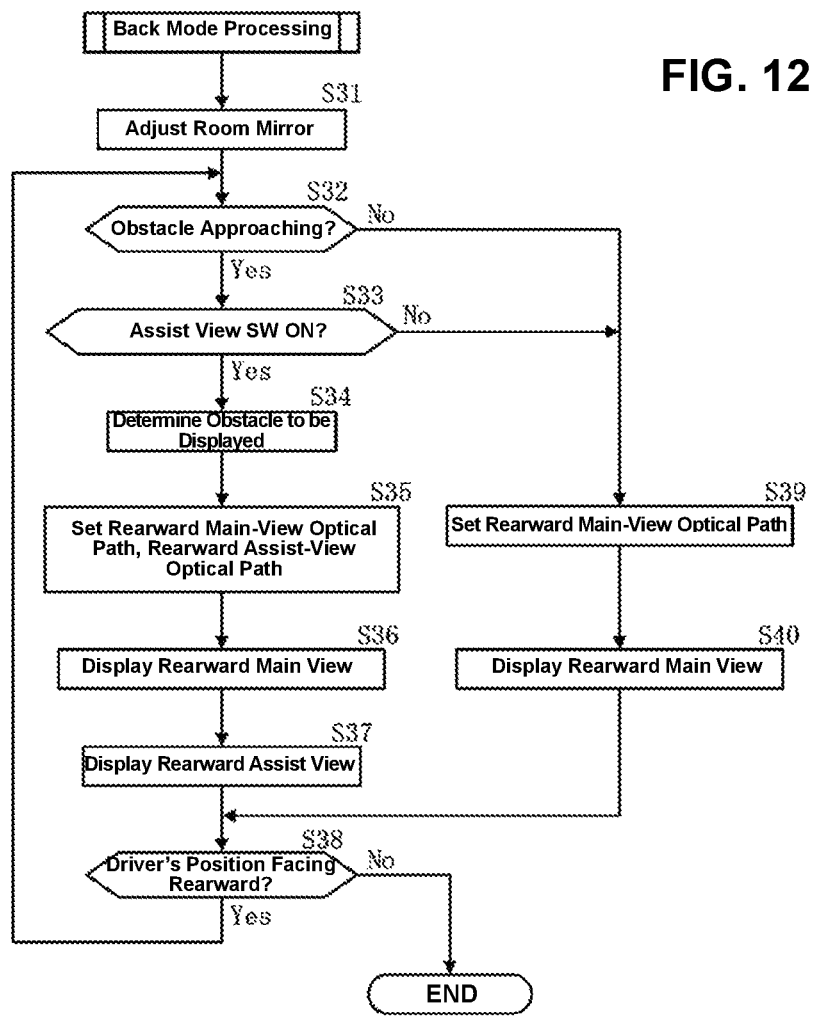
FIG. 12 is a flowchart showing back-mode processing steps.

Next, the back mode processing (in the step S10) will be described. As shown in the flowchart of FIG. 12, an inclination angle of the room mirror 7 is adjusted by the drive portion 7*a* based on the distance LR in step S31 first, and then the processing proceeds to step S32. In the step S32, it is determined whether a single obstacle or plural obstacles approaching the vehicle V exist or not. In a case where it is determined in the step S32 that the obstacle approaching the vehicle V exists, the processing proceeds to step S33, where it is determined whether the assist view switch 64 is turned on or not.

In a case where it is determined in the step S33 that the assist view switch 64 is turned on, the processing proceeds to step S34, where it is determined whether the obstacle to be displayed is determined. In a case where it is determined in the step S34 that the plural obstacles exist, the obstacle selected with the command switch 66 is determined as the obstacle to be displayed. In step S35, the rearward main-view optical path and the rearward assist-view optical path are set based on the three-dimensional coordinates of the driver's eye point, and then the processing proceeds to step S36. Then, the rearward main view v3 is displayed (in the step S36), the rearward assist view v5 is displayed (in step S37), and then the processing proceeds to step S38.

In the step S38, it is determined whether the driver has the position being directed rearward or not. In a case where it is determined in the step S38 that the driver has the position being directed rearward, the processing returns to the step S32. In a case where the driver does not have the position being directed rearward, meanwhile, the processing is ended. In a case where it is determined in the step S32 that no obstacle approaching the vehicle V exits, or in a case where it is determined in the step S33 that the assist view switch 64 is not turned on, the rearward main-view optical path is set (in step S39), the rearward main view v3 is displayed (in step S40), and then the processing proceeds to the step S38.

Figure 13:
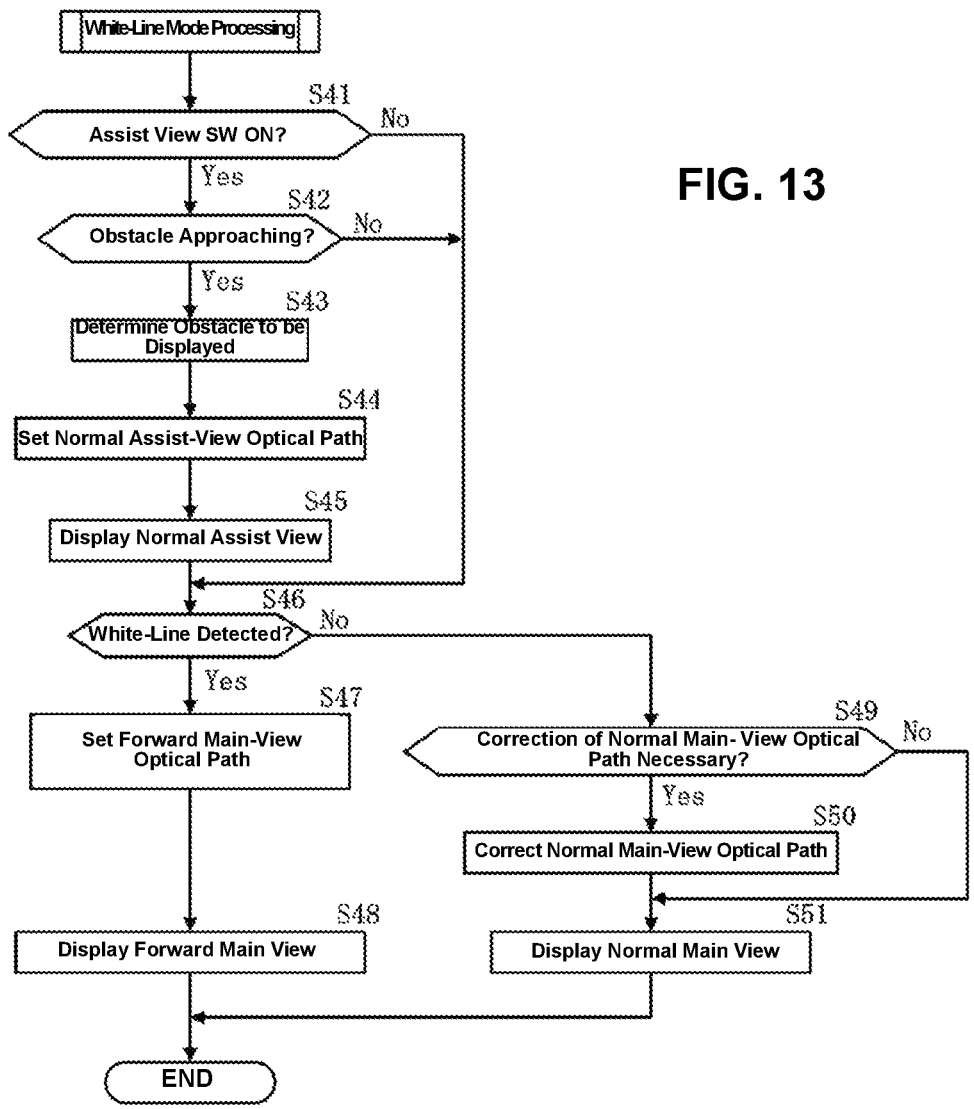
FIG. 13 is a flowchart showing white-line-display control processing steps.

Next, the white-line mode processing (in the step S16) will be described. As shown in the flowchart of FIG. 13, it is determined in step S41 first whether the assist view switch 64 is turned on or not. In a case where it is determined in the step S41 that the assist view switch 64 is turned on, the processing proceeds to step S42, where it is determined whether a single obstacle or plural obstacles approaching the vehicle V exist or not. In a case where it is determined in the step S42 that the obstacle approaching the vehicle V exists, the processing precedes to step S43, where the obstacle to be displayed is determined. In a case where it is determined that the plural obstacles exist, the obstacle selected with the command switch 66 is determined as the obstacle to be displayed. Next, in step S44, the normal assist-view optical path is set, the normal assist view v4 is displayed at a position located in back of the front end of the bonnet 10 on the side of the obstacle's existence (in step S45), and then the processing proceeds to step S46.

It is determined whether the white line is detected on the traveling lane in the step S46. In a case where it is determined in the step S46 that the white line is detected on the traveling lane, the forward main-view optical path is set (in step S47), the forward main view v2 is displayed such that the lower end portion of the white line displayed in the forward main view v2 substantially matches the corresponding white line on the traveling lane and also the more the vehicle speed increases, the more forward the forward main view v2 moves (in step S48), and then the processing is ended.

In a case where it is determined in the step S46 that the white line is not detected on the traveling lane, the processing proceeds to step S49, where it is determined whether it is necessary to correct the normal main-view optical path for setting the normal main-view optical path or not. Herein, the correction of the normal main-view optical path means correcting in such a manner that the outside corner portions, in the vehicle width direction, of the lower sides of the normal main views v1 substantially match the outside end portions, in the vehicle width direction, of the visual-field angle width when the driver's visual-field angle width becomes smaller than the lateral width of the front end of the bonnet 10. Further, this correction means such that the size of the normal main view v1 which displays the normal assist view v4 is set to be smaller than that of the normal main view vi which does not display the normal assist view v4. In a case where it is determined in the step S49 that it is necessary to correct the normal main-view optical path, the normal main-view optical path is corrected (in step S50), the normal main view v1 is displayed (in step S51), and then the processing is ended. In a case where it is determined in the step S49 that it is not necessary to correct the normal main-view optical path, the processing proceeds to the step S51 without correcting the normal main-view optical path.

Figure 14:
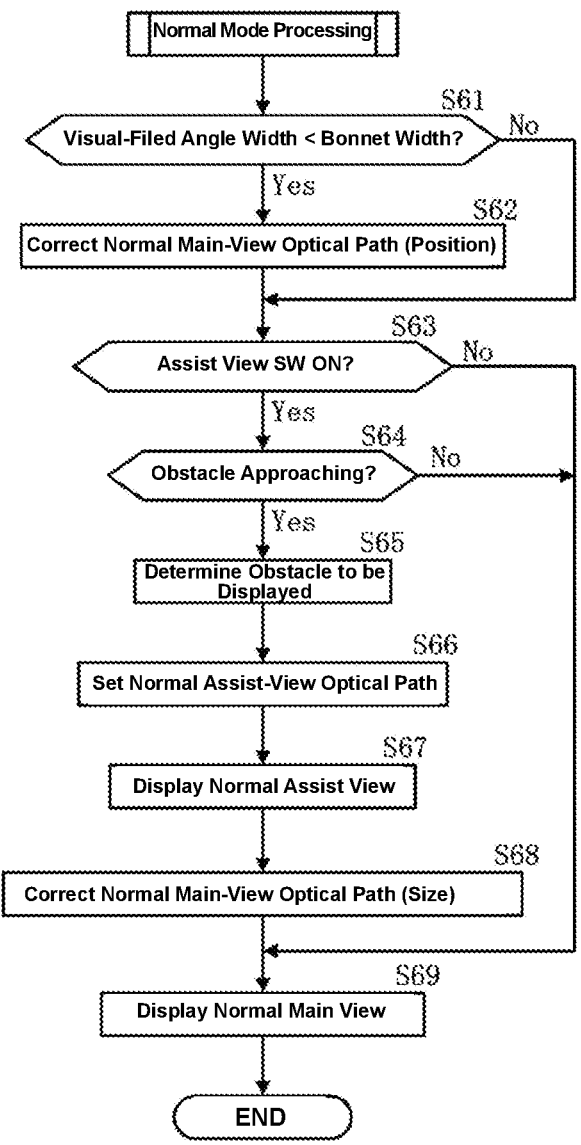
FIG. 14 is a flowchart showing normal-mode processing steps.

Next, the normal mode processing (in the step S17) will be described. As shown in the flowchart of FIG. 14, it is determined in step S61 first whether the driver's visual-field angle width is smaller than the lateral width of the front end of the bonnet 10 or not. In a case where it is determined in the step S61 that the driver's visual-field angle width is smaller than the lateral width of the front end of the bonnet 10, the processing proceeds to step S62, where the lateral position of the normal main-view optical path is corrected such that the distance between the pair of normal main views becomes the angle width of the driver's visual field. Next, it is determined in step S63 whether the assist view switch 64 is turned on or not.

In a case where it is determined in the step S63 that the assist view switch 64 is turned on, the processing proceeds to step S64, where it is determined whether a single obstacle or plural obstacles approaching the vehicle V exist or not. In a case where it is determined in the step S64 that the obstacle approaching the vehicle V exists, the processing proceeds to step S65, where the obstacle to be displayed is determined. In a case where the plural obstacles exist, the obstacle selected by the command switch 66 is determined as the obstacle to be displayed. Next, in step S66, the normal assist-view optical path is set, the normal assist view v4 is displayed at a position located in back of the front end of the bonnet 10 which is located on the side of obstacle's existence (in step S67), and the processing proceeds to step S68.

In the step S68, correcting of the normal main-view optical path for making the size of the normal main view v1 positioned on the side where the normal assist view v4 is displayed smaller than that of the normal main view v1 positioned on the side where the normal assist view v4 is not displayed is conducted, the normal main view v1 is displayed (in step S69), and the processing is ended. In a case where it is determined in the step S63 that the assist view switch 64 is not turned on, or in a case where it is determined in the step S64 that the obstacle approaching the vehicle V does not exist, the processing proceeds to the step S69, without setting the normal assist-view optical path or changing the size of the normal main view v1. In a case where it is determined in the step S61 that the driver's visual-field angle width is not smaller than the lateral width of the front end of the bonnet 10, the processing proceeds to the step S63, without changing the lateral position of the normal main-view optical path.

Hereafter, the operations/effects of the present display apparatus 1 for the vehicle of the present embodiment will be described. According to the present display apparatus 1 of the vehicle V, since the distance calculation portion 52 of the ECU 50 calculates the distance between the eyeball position detected by the inside camera 18a and the normal virtual-image display position P1 which is located in the vicinity of the front end and the end portion, in the vehicle width direction, of the bonnet 10, an accurate positional relation between the driver's eyeball position and the normal virtual-image display position P1 located in the vicinity of the front end and the end portion, in the vehicle width direction, of the bonnet 10 can be detected. Since the ECU 50 controls the main HUDs 20, 30 based on the calculated distance by the distance calculation portion 52 such that the normal main view v1 is displayed at the normal virtual-view display position P1, the driver can recognize the side-and-rearward view information of the vehicle V, keeping the driver's visual line directed to the vehicle traveling direction, thereby intuitively recognizing the width of the own vehicle V from the side-and-rearward view information of the vehicle V.

Since the present display apparatus 1 comprises the completion confirmation switch 62 which is operable by the driver and the ECU 50 starts displaying of the normal main view v1 when it is determined that the driving preparation by the driver is complete, the normal main-view optical path can be set based on the positional relation between the driver's eyeball position and the normal virtual-image display position P1.

Since the present display apparatus 1 comprises the ignition switch 61 to detect the operational state of the ignition and the door-lock sensor 68 to detect the operational state of the door lock, and the ECU 50 ends the virtual image displaying of the normal pickup image information when it is detected that the ignition is an OFF state and the door lock is locked from the vehicle outside, the virtual image of the side-and-rearward view information of the vehicle V can be displayed until the driver has got off the vehicle.

Since the present display apparatus 1 comprises the pair of right-and-left side-rearward cameras 11, 12 and the pair of right-and-left main HUDs 20, 30, and the pair of right-and-left main HUDs 20, 30 comprise the pair of laser-type projectors 21, 31 which are configured to have different optical paths and arranged in the instrument panel 4 on a driver's seat side, the pair of main HUDs 20, 30 which are capable of independently controlling the optical path can be provided, without influencing other devices.

Since the pair of normal main views v1 are displayed at the both-end positions of the angle width of the visual field of the driver which are located in the vicinity of the front end of the bonnet 10 when the angle width of the visual field of the driver which are located at the front end of the vehicle body is narrower than the width of the vehicle, the side-and-rearward view information of the vehicle V can be recognized regardless of the vehicle speed.

Next, some modifications where the above-described embodiment is partially modified will be described.

1] While the above-described embodiment described an example where the present invention was applied to a side-mirrorless automotive vehicle which are not provided with a side mirror, such as a fender mirror or a door mirror, the present invention is applicable to a vehicle equipped with the side mirror. In particular, the driver can intuitively recognize the width of the own vehicle even if the door mirror is provided, and the driver can recognize the side-rearward information of the vehicle, without moving the visual line, even if the fender mirror is provided.

2] While the above-described embodiment described an example where the obstacle pickup image information of the obstacle camera was displayed at the assist view which was independent from the main view, the pickup image information of the side-rearward camera may be displayed at the assist view in addition to the obstacle camera. Specifically, in a case where the obstacle to be displayed is picked up by at least one of the side-rearward cameras, a driver's side area of the normal main view picking up the image of the obstacle (an area positioned in back of the front end portion of the bonnet) is enlarged and the main view and the assist view are integrally displayed.

3] While the above-described embodiment described an example where the stop conditions of the main HUD was set to be ignition off and locking from the vehicle outside or specified-time lapse, at least one of an off signal of a seat sensor and a nonexistence confirmation signal of the inside camera may be added to the above-described conditions. Thereby, it can be surely detected that the drier has gotten off.

4] While the above-described embodiment described an example where the color and the brightness of the assist view's frame are set to be different from those of the main view's frame, the frame of the assist view may be configured to flicker when the obstacle approaches within a threshold distance. Further, warning of the drive assist device may be used together to draw driver's attention.

5] While the above-described embodiment described an example where the color and the brightness of the assist view's frame are control, the color and the brightness of the main view's frame may be controlled. Specifically, the frame of the main view which is position on the side where a turn-signal lamp flickers may be configured to flicker.

Figure 15:
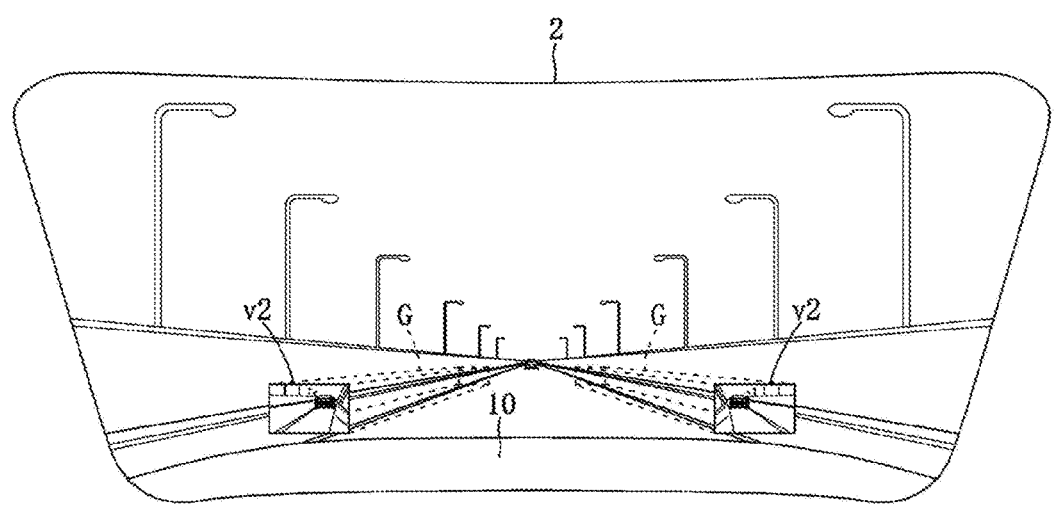
FIG. 15 is a diagram showing another display example of the while-line mode.

6] While the above-described embodiment described an example where the while-line mode is configured such that the more the vehicle speed increases, the more forward the forward main view v2 moves without precaution, the movable ranges of the forward main views v2 may be displayed as a pair of right-and-left movable-range virtual images G as shown in FIG. 15.

Figure 16A:
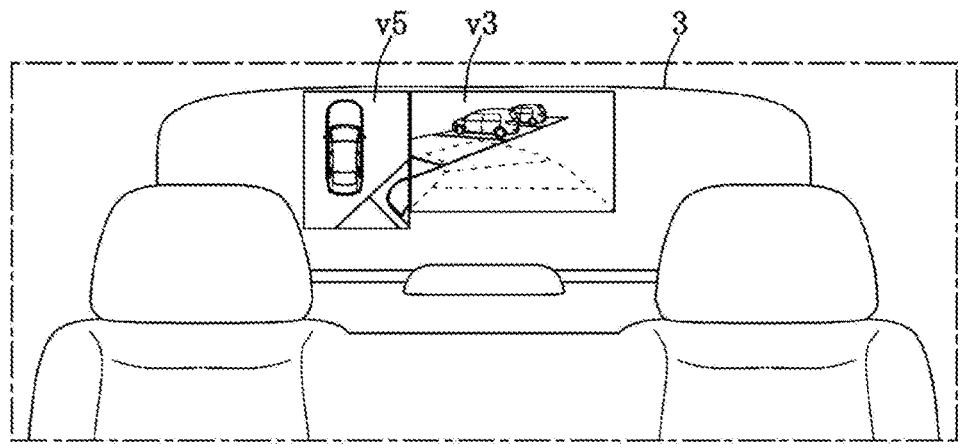
FIGS. 16A and 16B are diagrams showing another display example of the back mode, FIG. 16A showing a state where a top view is displayed at an assist view, FIG. 16B showing a state where a side view is displayed on the assist view.
Figure 16B:
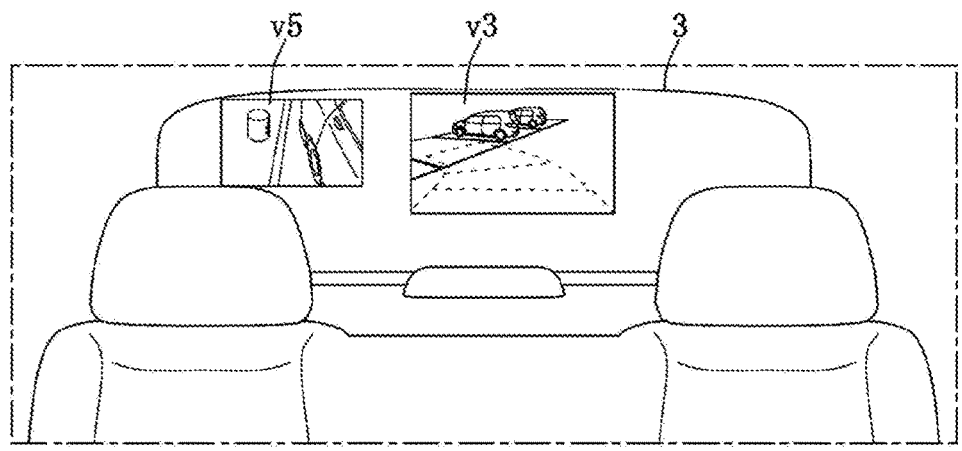

7] While the above-described embodiment described an example where the left side-and-rearward assist view v5 is displayed in the back mode, a top view of the own vehicle during moving may be displayed at the assist view v5 as shown in FIG. 16A. Further, as shown in FIG. 16B, a side view picking up the images of the curb and the like may be displayed at the assist view v5.

8] The present invention should not be limited to the above-described embodiments and any other modifications or improvements may be applied within the scope of a spirit of the present invention.

What is claimed is:
1. A display apparatus for a vehicle, comprising:
a pair of right-and-left image pickup devices to pick up respective rearward images from both side portions, in a vehicle width direction, of the vehicle;
an eyeball-position detecting device to detect a position of an eyeball of a driver;
a vehicle-speed sensor to detect a speed of the vehicle;

a pair of right-and-left optical devices respectively comprising a projector and an optical-path changer, the projector being configured to form a virtual image in front of the driver by projecting image information picked up by each of the pair of image pickup devices to a reflector, the optical-path changer being configured to adjust a position of the virtual image formed by the projector by changing an optical path of the image information; and a controller to control the projector and the optical-path changer of each of the pair of optical devices, wherein said controller is configured to perform the process of:

calculating a distance between the eyeball position detected by said eye-ball-position detector and a specified virtual-image display position which is located in the vicinity of a front end and right-and-left both ends, in the vehicle width direction, of a vehicle body;

controlling said pair of optical devices based on said calculated distance such that a position of said virtual images formed by the projectors matches said specified virtual-image display position;

determining whether an angle width of a visual field of the driver which is located in the vicinity of the front end of the vehicle body, which depends on the vehicle speed detected by said vehicle-speed sensor, is smaller than a lateral width of the front end of the vehicle body or not; and correcting the virtual-image display position, when it is determined that said angle width of the visual field of the driver is smaller than the lateral width of the front end of the vehicle body, such that the virtual images of a pair of image information picked up by the pair of image pickup devices are displayed at both-end positions of the angle width of the visual field of the driver which are located in the vicinity of the front end of the vehicle body.

2. The display apparatus for the vehicle of claim 1, further comprising a confirmation device for confirming completion of driving preparation which is to be operated by the driver, wherein said controller is configured to start displaying of said virtual image of the picked-up image information when it is confirmed by said confirmation device that the driving preparation is complete.

3. The display apparatus for the vehicle of claim 2, further comprising an ignition state detector to detect an operational state of an ignition and a door-lock state detector to detect an operational state of a door lock, wherein said controller is configured to end displaying of said virtual image of the picked-up image information when it is detected by said ignition state detector and said door-lock state detector that the ignition is an off state and the door lock is locked from an vehicle outside.

4. The display apparatus for the vehicle of claim 3, wherein said pair of right-and-left optical devices comprise a pair of laser-type projectors which are configured to have different optical paths and arranged in an instrument panel on a driver's seat side.

5. The display apparatus for the vehicle of claim 2, wherein said pair of right-and-left optical devices comprise a pair of laser-type projectors which are configured to have different optical paths and arranged in an instrument panel on a driver's seat side.

6. The display apparatus for the vehicle of claim 1, further comprising an ignition state detector to detect an operational state of an ignition and a door-lock state detector to detect an operational state of a door lock, wherein said controller is configured to end displaying of said virtual image of the picked-up image information when it is detected by said ignition state detector and said door-lock state detector that the ignition is an off state and the door lock is locked from an vehicle outside.

7. The display apparatus for the vehicle of claim 6, wherein said pair of right-and-left optical devices comprise a pair of laser-type projectors which are configured to have different optical paths and arranged in an instrument panel on a driver's seat side.

8. The display apparatus for the vehicle of claim 1, wherein said pair of right-and-left optical devices comprise a pair of laser-type projectors which are configured to have different optical paths and arranged in an instrument panel on a driver's seat side.

* * * * *